United States Patent
Storer et al.

(10) Patent No.: US 9,740,403 B2
(45) Date of Patent: *Aug. 22, 2017

(54) METHODS FOR MANAGING STORAGE IN A DATA STORAGE CLUSTER WITH DISTRIBUTED ZONES BASED ON PARITY VALUES AND DEVICES THEREOF

(71) Applicant: NetApp, Inc., Sunnyvale, CA (US)

(72) Inventors: Mark W. Storer, Walnut Creek, CA (US); Timothy Bisson, Fremont, CA (US); Shankar Pasupathy, Milpitas, CA (US)

(73) Assignee: NetApp, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/636,055

(22) Filed: Mar. 2, 2015

(65) Prior Publication Data

US 2015/0324123 A1  Nov. 12, 2015

Related U.S. Application Data

(63) Continuation of application No. 13/479,171, filed on May 23, 2012, now Pat. No. 8,972,478.

(51) Int. Cl.
*G06F 13/00* (2006.01)
*G06F 3/06* (2006.01)
(Continued)

(52) U.S. Cl.
CPC ............. *G06F 3/061* (2013.01); *G06F 3/064* (2013.01); *G06F 3/067* (2013.01); *G06F 3/0619* (2013.01);
(Continued)

(58) Field of Classification Search
CPC ...... G06F 3/0635; G06F 11/108; G06F 3/061; G06F 3/064; G06F 3/0689;
(Continued)

(56) References Cited

U.S. PATENT DOCUMENTS 5,488,731 A  1/1996  Mendelsohn
6,725,392 B1  4/2004  Frey et al.
(Continued)

OTHER PUBLICATIONS

Non-Final Office Action mailed Jun. 17, 2014, for U.S. Appl. No. 13/479,171 of Storer et al., filed May 23, 2012.
(Continued)

*Primary Examiner* — Hong Kim
(74) *Attorney, Agent, or Firm* — LeClairRyan, a Professional Corporation (57) ABSTRACT

Techniques for a data storage cluster and a method for maintaining and updating reliability data and reducing data communication between nodes, are disclosed herein. Each data object is written to a single data zone on a data node within the data storage cluster. Each data object includes one or more data chunks, and the data chunks of a data object are written to a data node in an append-only log format. When parity is determined for a reliability group including the data zone, there is no need to transmit data from other data nodes where the rest of data zones of the reliability group reside. Thus, inter-node data communication for determining reliability data is reduced.

19 Claims, 7 Drawing Sheets

(51) Int. Cl.
 *G06F 11/10* (2006.01)
 *G06F 11/14* (2006.01)
(52) U.S. Cl.
 CPC .......... *G06F 3/0635* (2013.01); *G06F 3/0665* (2013.01); *G06F 3/0689* (2013.01); *G06F 11/108* (2013.01); *G06F 11/1072* (2013.01); *G06F 11/1453* (2013.01); *G06F 2201/84* (2013.01)
(58) Field of Classification Search
 CPC ............ G06F 11/1072; G06F 2201/84; G06F 11/1453; G06F 3/0619; G06F 3/067; G06F 3/0665; G06F 11/1076; G06F 2211/1028; G06F 11/2082; G06F 11/2094
 USPC .......................... 709/201; 711/114; 714/6.22
 See application file for complete search history.

(56) References Cited

U.S. PATENT DOCUMENTS

| | | | |
|---|---|---|---|
| 8,972,478 B1* | 3/2015 | Storer | G06F 3/061 709/201 |
| 2007/0022144 A1* | 1/2007 | Chen | G06F 11/2064 |
| 2008/0270704 A1 | 10/2008 | He et al. | |
| 2008/0313416 A1 | 12/2008 | Frondozo et al. | |
| 2011/0055261 A1* | 3/2011 | Makkar | H04L 67/1097 707/770 |

OTHER PUBLICATIONS

Notice of Allowance mailed Oct. 24, 2014, for U.S. Appl. No. 13/479,171 of Storer et al., filed May 23, 2012.

\* cited by examiner

METHODS FOR MANAGING STORAGE IN A DATA STORAGE CLUSTER WITH DISTRIBUTED ZONES BASED ON PARITY VALUES AND DEVICES THEREOF

PRIORITY CLAIM

This application is a continuation of U.S. patent application Ser. No. 13/479,171, entitled "DATA STORAGE CLUSTER WITH DISTRIBUTED ZONES" and filed on May 23, 2012, now U.S. Pat. No. 8,972,478 issued Mar. 3, 2015, the contents of which is incorporated herein by reference in its entirety.

FIELD OF THE INVENTION

At least one embodiment of the present invention pertains to data storage clusters, and more particularly, to a data storage cluster having distributed zones that provides data reliability.

BACKGROUND

Scalability is an important requirement in many data storage systems, particularly in network-oriented storage systems such as network attached storage (NAS) systems and storage area network (SAN) systems. Different types of storage systems provide diverse methods of seamless scalability through storage capacity expansion. In some storage systems, such as systems utilizing redundant arrays of inexpensive disk ("RAID") controllers, it is often possible to add disk drives (or other types of mass storage devices) to a storage system while the system is in operation. In such a system, a RAID controller re-stripes existing data onto a new disk and makes the capacity of the other disks available for new input/output ("I/O") operations. This methodology, known as "vertical capacity expansion," is common. However, this methodology has at least one drawback in that it only scales data storage capacity, without improving other performance factors such as the processing power, main memory, or bandwidth of the system.

In other data storage systems, it is possible to add capacity by "virtualization." In this type of system, multiple storage servers are utilized to field input/out (I/O) operations (i.e., reads and writes) independently, but are exposed to the initiator of the I/O operation as a single device, called a "storage cluster." Each storage server in a cluster is called a "storage node", a "data node" or just a "node." When available data storage capacity becomes low, a new server may be added as a new node in the data storage system. In addition to contributing increased storage capacity, the new storage node contributes other computing resources to the system, leading to true scalability. This methodology is known as "horizontal capacity expansion." Some storage systems support vertical expansion of individual nodes as well as horizontal expansion by the addition of storage nodes.

Systems implementing horizontal capacity expansion may concatenate the capacity that is contributed by each node. However, in order to achieve the maximum benefit of horizontal capacity expansion, it is common to stripe data across the nodes in a similar manner to how data is striped across disks in RAID arrays. While striping data across nodes, the data is stored in a manner that ensures that different I/O operations are fielded by different nodes, thereby utilizing all of the nodes simultaneously. It is also desirable to avoid splitting I/O operations between multiple nodes, so that the I/O latency is low. Striping the data in this manner provides a boost to random I/O performance without decreasing sequential I/O performance. Each stripe in this type of implementation is called a "storage zone", "data zone", or just "zone." Each node may contain multiple zones.

In order to provide data reliability, multiple data zones can be grouped as a reliability group. A reliability group provides data reliability for the data zones by including parity zone(s). Each data zone in the reliability group may reside on a separate node; or some data zones in the reliability group may reside on one node. In addition to the data zones, the reliability group may also include one or more parity zones. The parity zones may also reside on separate nodes. A parity zone contains reliability data encoded from the data of the data zones of its reliability group. Similar to the parity concept in RAID systems, the parity zones provide an error protection scheme for the data within the reliability group. In case one or more data zones of the reliability group is inaccessible or contains erroneous data, the reliability data in the parity zones may be utilized in combination with data in the still-accessible zones to correct the error or restore a copy of the data in the inaccessible data zone(s).

However, data zones and parity zones of a reliability group typically reside on separate nodes. In order to restore data or correct an error using the reliability data in a parity zone, other data nodes also needs to transmit data in other data zones to the node having the reliability data. The situation involves a large number of network requests for exchanging data between nodes and poses serious I/O burdens on the data nodes. For a data storage cluster containing a large number of nodes, this can cause severe performance issues.

SUMMARY

The technology introduced here includes a data storage cluster and a method for maintaining and updating reliability data while reducing data communication between nodes in the data storage cluster. The technology provides for fast and secure data writing. It is particularly advantageous for applications leveraging enterprise-level storage, where secure and fast write response that can survive a node failure is highly desirable.

In accordance with the techniques introduced here, each data object written to the data storage cluster is written to a single data zone on a data node within the data storage cluster. A data object includes one or more data "chunks." The data chunks of the data object are written to the data node in an append-only log format, as opposed to striping the data chunks of the data object across zones on separate nodes.

Once the data chunks of a data object are written to a data zone on a data node, the reliability data in the corresponding parity zones of the same reliability group needs to be determined accordingly. Since append-only log format is utilized, only the newly written data chunks need to be transmitted to the node(s) where the reliability data is determined and maintained. There is no need to transmit data from other data nodes where the rest of the data zones of the reliability group reside. Thus, inter-node communication for determining reliability data is reduced to a data transmission from one node within the data storage cluster.

The write request of the data chunks may be temporarily stored in a non-volatile staging area of a data node and then replicated to separate nodes. This enables quick client write responses and provides redundancy of the data chunks in case of node failure.

The technology introduced here further includes a method for handling requests for storing data. In one embodiment the method comprises: receiving, at a first data node of a plurality of data nodes within a data storage cluster, a request for storing a data object including one or more data chunks; writing the data chunks to a data zone of the first data node in an append-only log format, wherein the data zone is assigned to a reliability group defined across more than one of the data nodes within the data storage cluster; sending the data chunks to a second data node of the plurality of data nodes within the data storage cluster, wherein the second data node includes a parity zone assigned to the reliability group to which the data zone of the first data node is assigned; and determining parity values for the reliability group at the second data node based on the data chunks received by the second data node, wherein the determining of the parity values does not require use of information from data nodes other than the first and second data nodes.

Other aspects of the technology introduced here will be apparent from the accompanying figures and from the detailed description which follows.

BRIEF DESCRIPTION OF THE DRAWINGS

These and other objects, features and characteristics of the present invention will become more apparent to those skilled in the art from a study of the following detailed description in conjunction with the appended claims and drawings, all of which form a part of this specification. In the drawings:

DETAILED DESCRIPTION

References in this specification to "an embodiment," "one embodiment," or the like, mean that the particular feature, structure, or characteristic being described is included in at least one embodiment of the present invention. All occurrences of such phrases in this specification do not necessarily refer to the same embodiment.

Techniques for a data storage cluster and a method for maintaining and updating reliability data while reducing data communication between nodes are disclosed. Each data object is written to one of the data zones on a data node within a reliability group of the data storage cluster. Therefore, for each data object, all data chunks of that data object are written to a single data zone. The data chunks of the data object are written to the data node in an append-only log format, as opposed to striping the data chunks of the data object across zones on separated nodes. When parity is determined for a reliability group including the data zone, there is no need to transmit data from other data nodes where the rest of data zones of the reliability group reside, because the data node to store the parity already has the data needed to compute the parity. Thus, data communication for determining reliability data is reduced.

An append-only log format means that data chunks are written to a zone only in an increasing order. In append-only log format, no over-write operation is performed on data chunks. The data chunks in each zone will only be appended to the log or cleaned; no data chunks will be modified. The data chunks are appended to locations on the storage in an increasing order, i.e. newer data chunks are written to latter locations on the storage. Cleaning data chunks means freeing the storage space of data zone where the data chunks is stored for reusing the storage space. If a data object needs to be modified, the modified data chunks of the data object will be appended as new data chunks according to the append-only log format. Corresponding old data chunks of the data object will be discarded.

Figure 1:
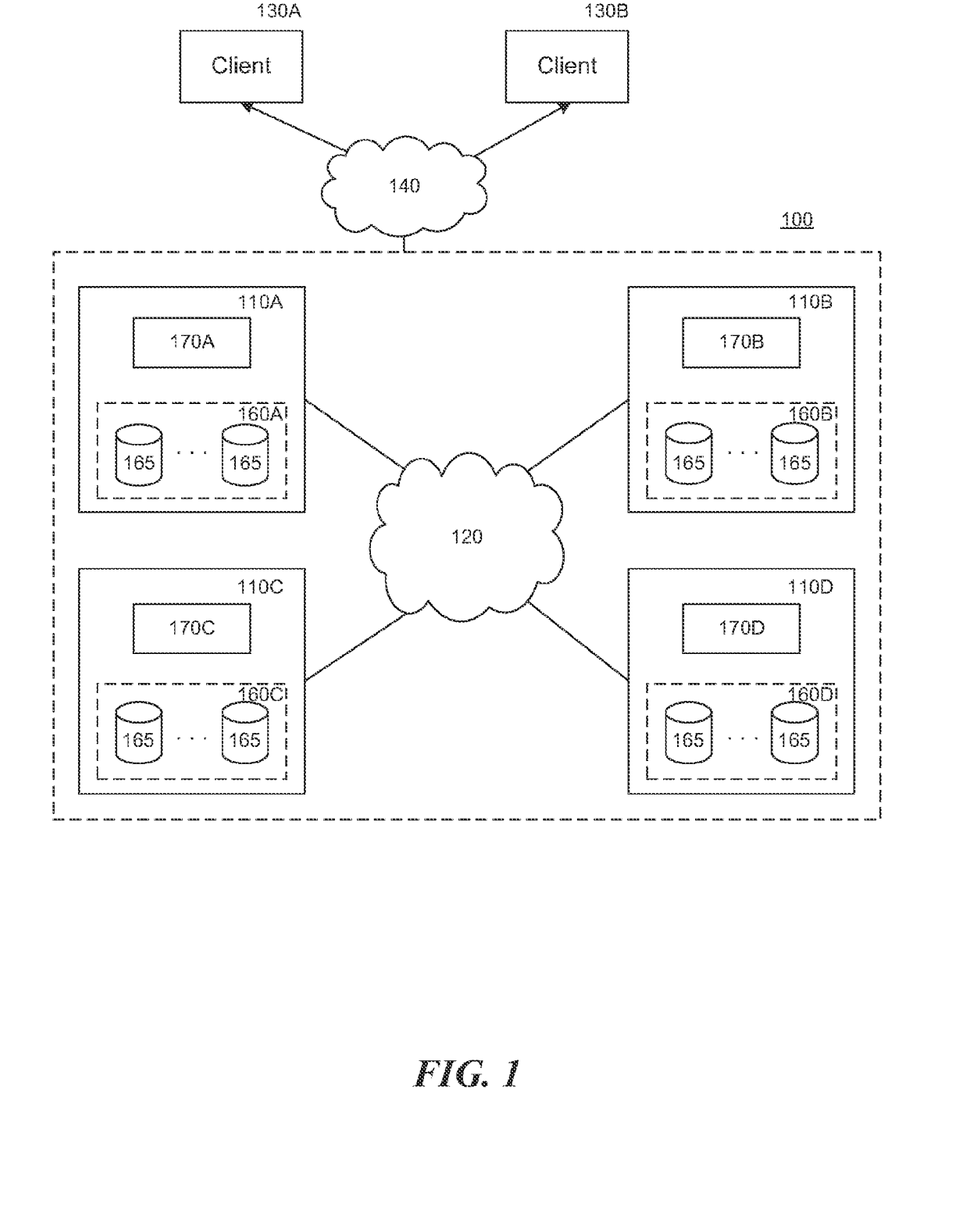
FIG. 1 illustrates an example of a data storage cluster in which the technique introduced here can be implemented.

Refer now to FIG. 1, which shows a data storage cluster in which the technique being introduced here can be implemented. In FIG. 1, the data storage cluster 100 includes a plurality of storage server nodes 110A, 110B, 110C and 110D. The nodes can communicate with each other through an interconnect 120. The interconnect 120 may be, for example, a local area network (LAN), wide area network (WAN), metropolitan area network (MAN), global area network such as the Internet, a Fibre Channel fabric, or any combination of such interconnects. Clients 130A and 130B may communicate with the data storage cluster 100 by contacting one of the nodes via a network 140, which can be, for example, the Internet, a LAN, or any other type of network or combination of networks. Each of the clients may be, for example, a conventional personal computer (PC), server-class computer, workstation, handheld computing/communication device, or the like.

Each node 110A, 110B, 110C or 110D receives and responds to various read and write requests from clients such 130A or 130B, directed to data stored in or to be stored in persistent storage 160. Each of the nodes 110A, 110B, 110C and 110D contains a persistent storage 160 which includes a number of nonvolatile mass storage devices 165. The nonvolatile mass storage devices 165 can be, for example, conventional magnetic or optical disks or tape drives; alternatively, they can be non-volatile solid-state memory, such as flash memory, or any combination of such devices. In some embodiments, the mass storage devices 165 in each node can be organized as a Redundant Array of Inexpensive Disks (RAID), in which the node 110A, 110B, 110C or 110D accesses the persistent storage 160 using a conventional RAID algorithm for redundancy.

Each of the nodes 110A, 110B, 110C or 110D may contain a storage operating system 170 that manages operations of the persistent storage 160. In certain embodiments, the storage operating systems 170 are implemented in the form of software. In other embodiments, however, any one or more of these storage operating systems may be implemented in pure hardware, e.g., specially-designed dedicated circuitry, or partially in software and partially as dedicated circuitry.

Each of the nodes 110A, 110B, 110C and 110D may be, for example, a storage server which provides file-level data access services to hosts, such as commonly done in a NAS environment, or block-level data access services such as commonly done in a SAN environment, or it may be capable of providing both file-level and block-level data access services to hosts. Further, although the nodes 110A, 110B, 110C and 110D are illustrated as single units in FIG. 1, each node can have a distributed architecture. For example, a node can be designed as a combination of a network module (e.g., "N-blade") and disk module (e.g., "D-blade") (not shown), which may be physically separate from each other and which may communicate with each other over a physical interconnect. Such an architecture allows convenient scaling, such as by deploying two or more N-modules and D-modules, all capable of communicating with each other through the interconnect.

Figure 2:
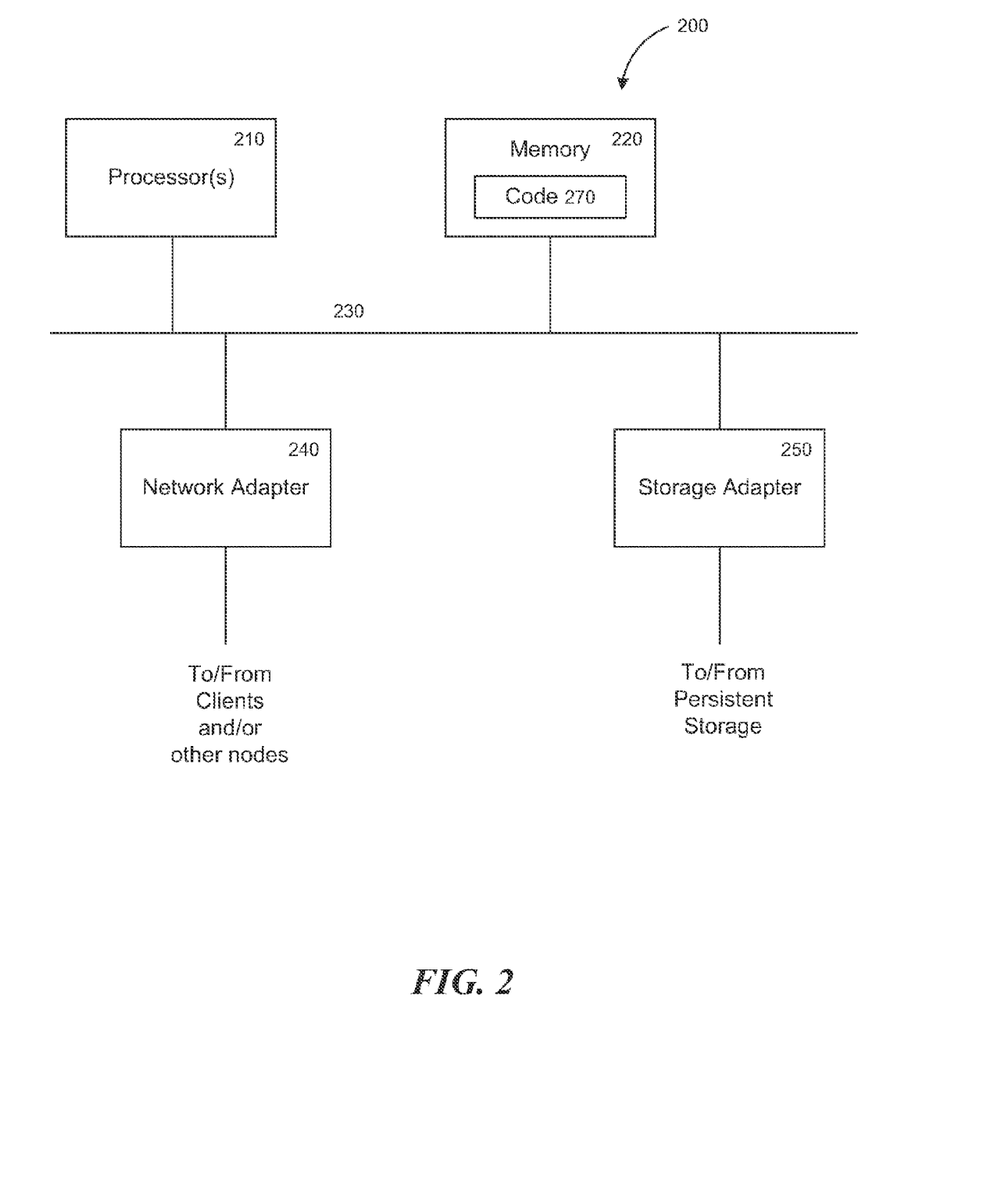
FIG. 2 is a high-level block diagram showing an example of the architecture of a node of the data storage cluster.

FIG. 2 is a high-level block diagram showing an example of the architecture of a node 200, which may represent any of nodes 110A, 110B, 110C or 110D. The node 200 includes one or more processors 210 and memory 220 coupled to an interconnect 230. The interconnect 230 shown in FIG. 2 is an abstraction that represents any one or more separate physical buses, point to point connections, or both connected by appropriate bridges, adapters, or controllers. The interconnect 230, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 210 is/are the central processing unit (CPU) of the storage controller 200 and, thus, control the overall operation of the node 200. In certain embodiments, the processor(s) 210 accomplish this by executing software or firmware stored in memory 220. The processor(s) 210 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 220 is or includes the main memory of the node 200. The memory 220 represents any form of random access memory (RAM), read-only memory (ROM), flash memory, or the like, or a combination of such devices. In use, the memory 220 may contain, among other things, code 270 embodying at least a portion of a storage operating system of the node 200. Code 270 may also include a deduplication application.

Also connected to the processor(s) 210 through the interconnect 230 are a network adapter 240 and a storage adapter 250. The network adapter 240 provides the node 200 with the ability to communicate with remote devices, such as clients 130A or 130B, over a network and may be, for example, an Ethernet adapter or Fibre Channel adapter. The network adapter 240 may also provide the node 200 with the ability to communicate with other nodes within the data storage cluster. In some embodiments, a node may use more than one network adapter to deal with the communications within and outside of the data storage cluster separately. The storage adapter 250 allows the node 200 to access a persistent storage, such as persistent storage 160, and may be, for example, a Fibre Channel adapter or SCSI adapter.

The code 270 stored in memory 220 may be implemented as software and/or firmware to program the processor(s) 210 to carry out actions described below. In certain embodiments, such software or firmware may be initially provided to the node 200 by downloading it from a remote system through the node 200 (e.g., via network adapter 240).

The techniques introduced herein can be implemented by, for example, programmable circuitry (e.g., one or more microprocessors) programmed with software and/or firmware, or entirely in special-purpose hardwired circuitry, or in a combination of such forms. Special-purpose hardwired circuitry may be in the form of, for example, one or more application-specific integrated circuits (ASICs), programmable logic devices (PLDs), field-programmable gate arrays (FPGAs), etc.

Figure 3:
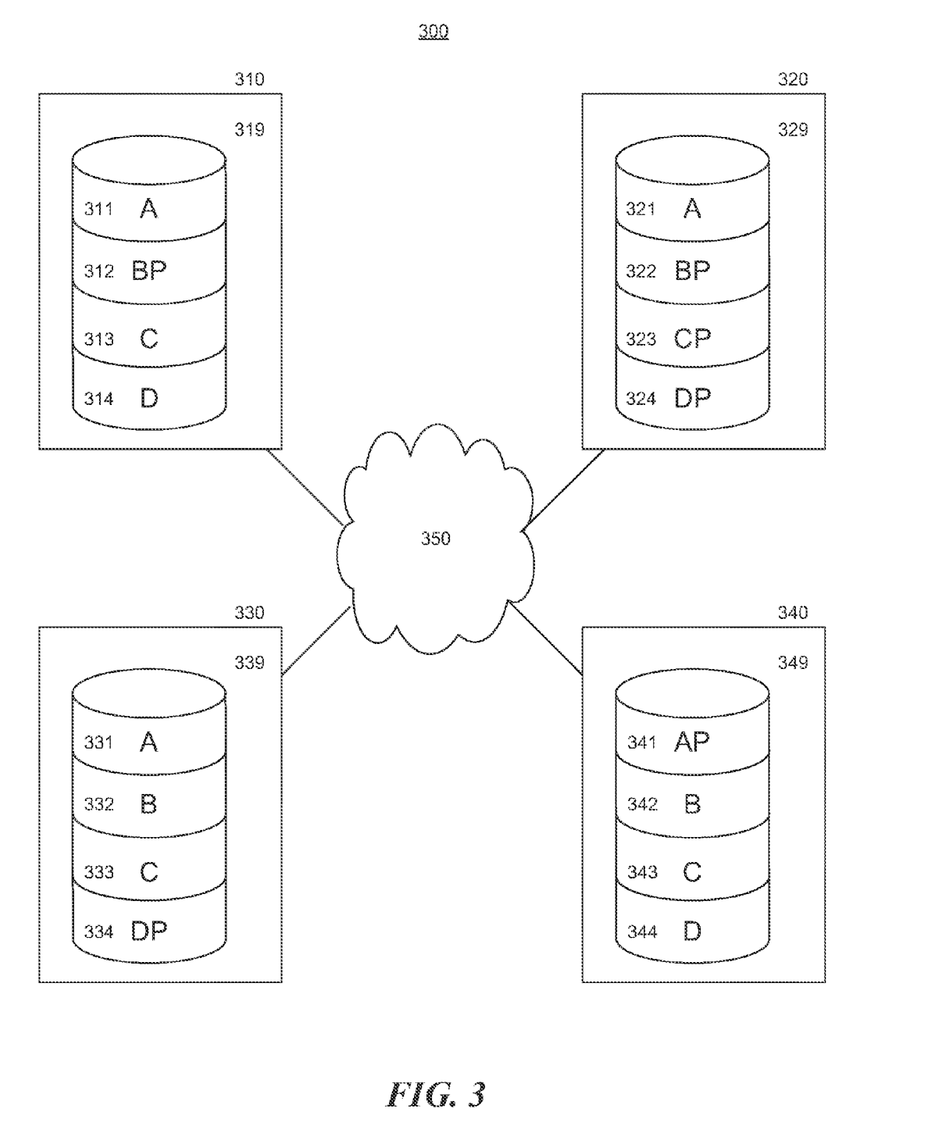
FIG. 3 illustrates an example of the data storage cluster with node storage spaces organized as zones.

It is useful to consider how data can be structured and organized in data storage clusters according to certain embodiments of the technique introduced here. Reference is made to FIG. 3 in this regard. As shown in FIG. 3, a data storage cluster 300 includes nodes 310, 320, 330 and 340 interconnected by an interconnect 350. Each of the nodes 310, 320, 330 and 340 has a persistent storage 319, 329, 339, 349, respectively. Each of the persistent storages 319, 329, 339 and 349 includes one or more logical data containers referred to as "zone." Multiple zones across all of the nodes are grouped as a reliability group, in order to provide data reliability. For example in FIG. 3, zones marked as "A" (311, 321, 331) and "AP" (341) forms one reliability group in the data storage cluster 300. Within the reliability group, three zones marked as "A" (311, 321, 331) in FIG. 3 are data zones storing data. The zone marked as "AP" (341) in FIG. 3 is a parity zone (also referred to as "reliability zone") of the reliability group, i.e., for the data in zones 311, 321 and 331. The parity zone 341 stores reliability data (also referred to as "parity data") that are metadata determined from the data of the data zones 311, 321 and 331 of the same reliability group. The reliability data may be determined from various methods, such as a simple XOR operation or a Reed-Solomon erasure code. The reliability data provides an error protection scheme. For example, when one zone within the reliability group is not accessible due to reasons such as node failure, data of that zone can be still recovered from the reliability data and data in other data zones of the same reliability group.

A reliability group can contain more than one parity zones. For example in FIG. 3, two data zones marked as "D" (314, 344) and two parity zones marked as "DP" (324, 334) form one reliability group. Two parity zones 324 and 334 within a reliability group generally provide more robust error protection than one parity zone.

Figure 4:
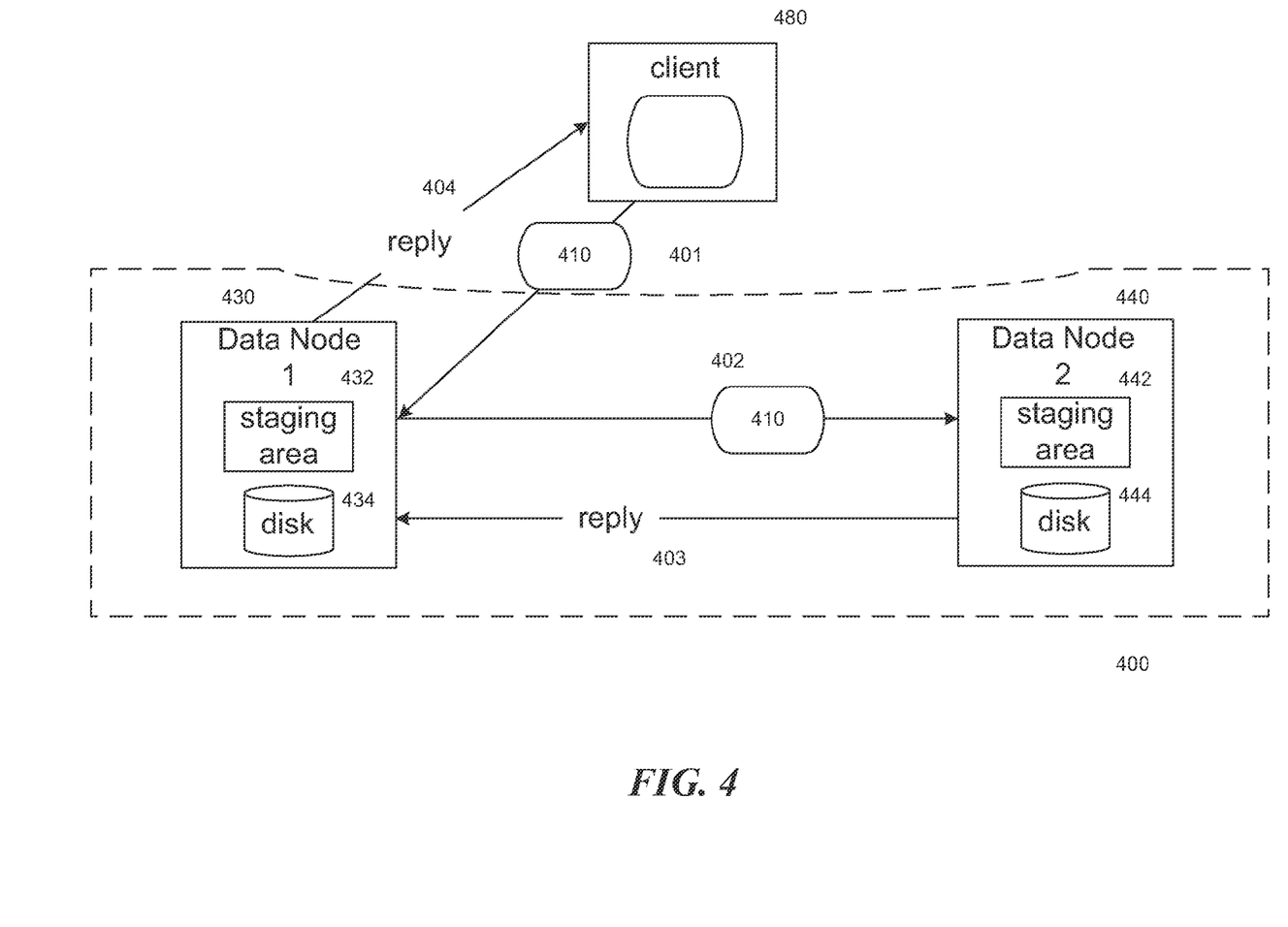
FIG. 4 illustrates an example of a process of the data storage cluster acknowledging a request for writing a data object.

When a data storage cluster receives a write request or read request from a client, it is important that the data storage cluster responds to the client in a quick manner acknowledging the request. FIG. 4 illustrates an example of a process of a data storage cluster receiving and acknowledging a write request. First, a client 480 sends a write request 401 for a data object 410 to a data node 430 within a data storage cluster 400. When the data node 430 receives the write request 401, the data node 430 first stores the data object 410 in a staging area 432 of the node 430. The staging area 432 may be, for example, a nonvolatile RAM (NVRAM), flash memory, or other nonvolatile mass storage, or a combination thereof. The data node 430 further sends a copy of the data object 410 to another node 440 within the data storage cluster 400. The node 440 sends a message 403 to node 430 acknowledging that a copy of the data object 410 is recorded in node 440. Upon receiving the acknowledging message 403, node 430 sends a message 404 to client 480 acknowledging that data object 410 is written to the data storage cluster 400. At this point, the data of data object 403 is stored in the staging area 432 in node 430 and the staging area 442 of node 440 but are not necessarily safe to long-term persistent storage (e.g., disks 434 and 444).

In one embodiment, the data of data object 403 is written to the staging areas 432 and 442 in an append-only log format. This enables a higher I/O throughput. As the staging areas 432 and 442 fill up, the data in the staging areas 432 and 442 is eventually destaged to persistent storage of the nodes, such as the nonvolatile mass storage 434 in node 430. In an append-only log format, only writes in an increasing order on the data storage medium are performed in the node.

Figure 5:
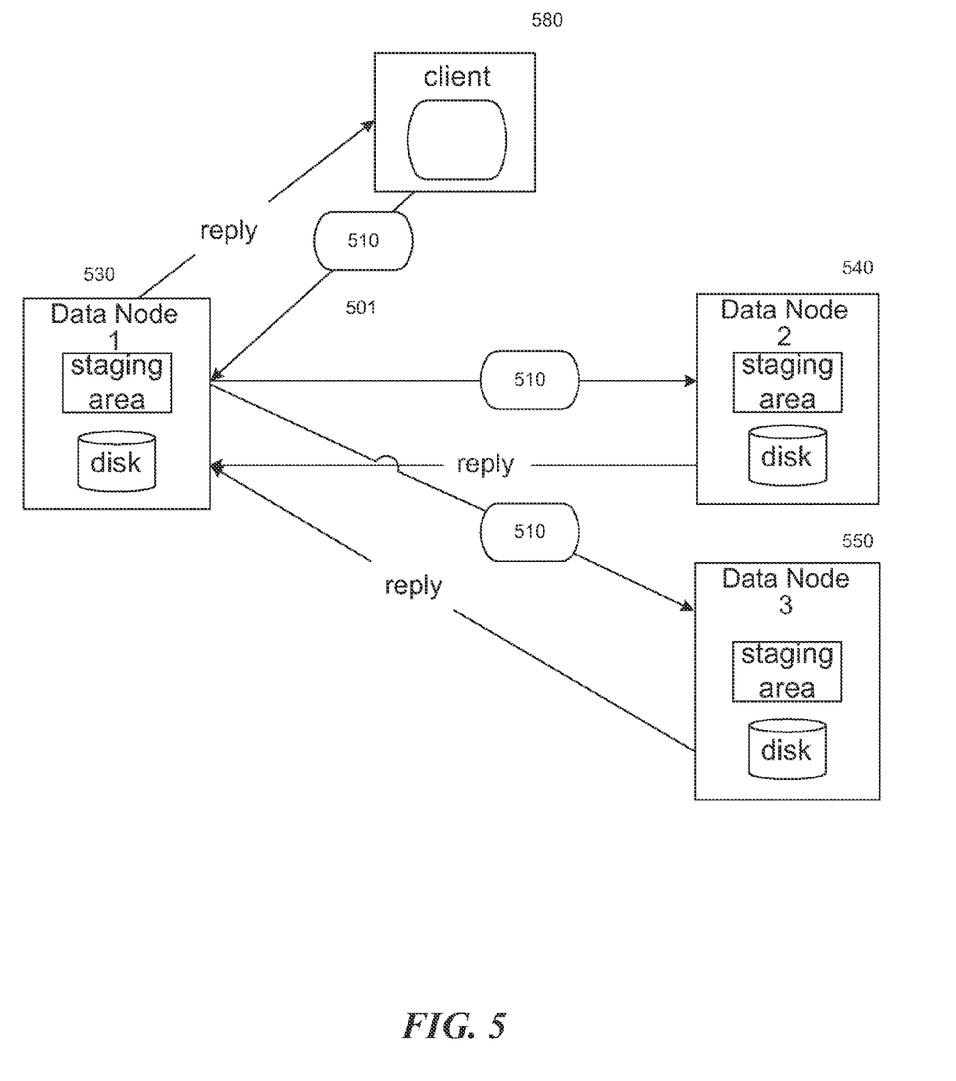
FIG. 5 illustrates another example of a process of the data storage cluster acknowledging a request for writing a data object.

In some embodiments, a write request may be replicated multiple times before the node that first received the request from a client acknowledges the request to a client. For example, in FIG. 5, node 530 forwards the write request 501 to the nodes 540 and 550. When both of nodes 540 and 550 respond that the data object 510 is recorded on nodes 540 and 550, only then will node 530 acknowledge the write request to client 580. In other embodiments, the original receiving node may forward a write request to more than two nodes within a data storage cluster.

Figure 6:
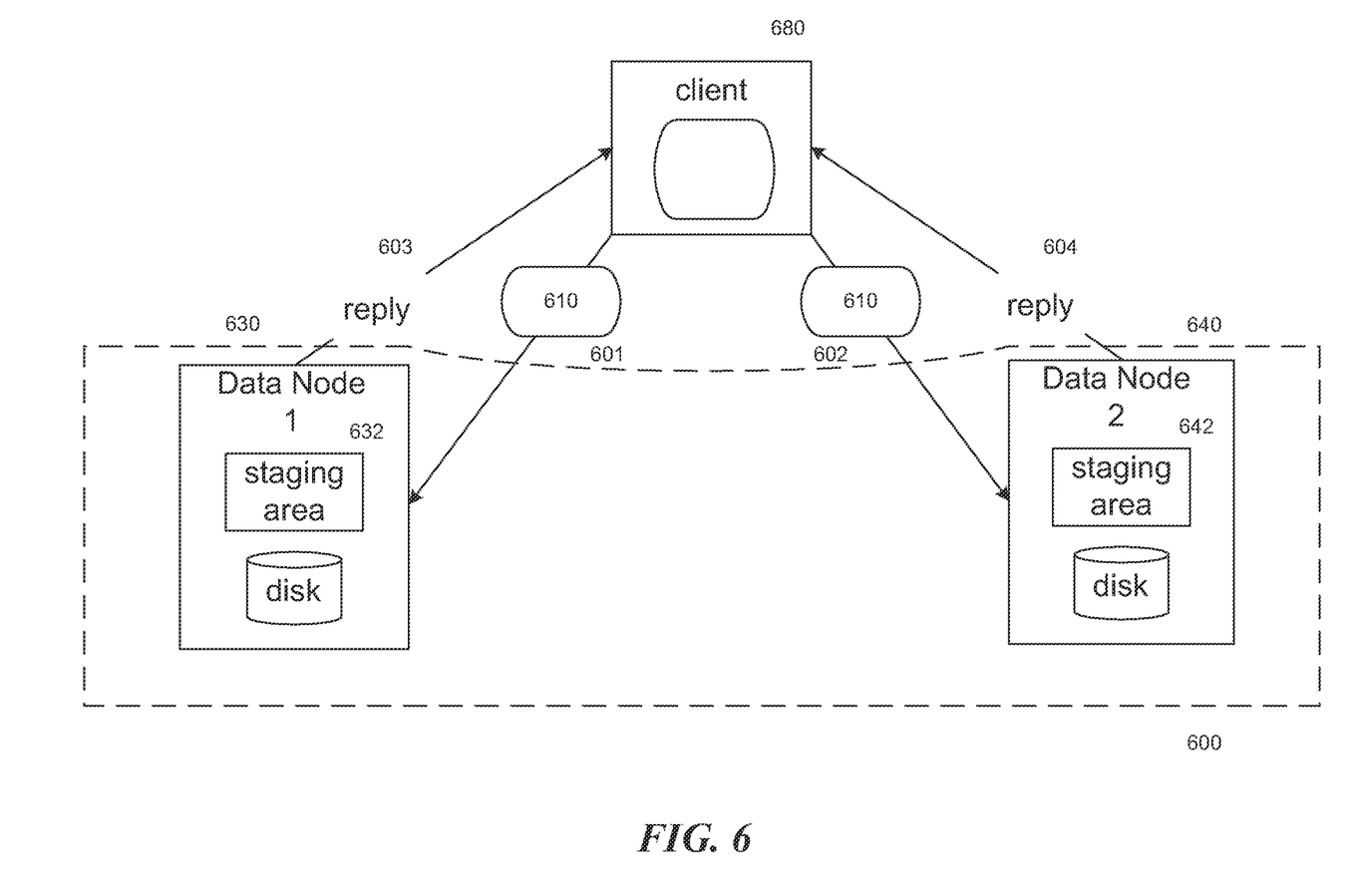
FIG. 6 illustrates yet another example of a process of the data storage cluster acknowledging a request for writing a data object.

In an alternative embodiment, as shown in FIG. 6, client 680 sends multiple write requests 601 and 602, respectively to node 630 and node 640 within a data storage cluster 600. After storing the data object 610 in staging area 632 and staging area 642 in nodes 630 and 640, both nodes 630 and 640 send acknowledgements 603 and 604 to client 680.

As discussed in the above paragraphs, upon receiving a write request, a node temporarily stores the write request in a staging area in a nonvolatile storage, before the write requests are written to a corresponding mass storage in the node. This technique enables fast write response for a data storage cluster. The write request can also be replicated to one or more separate nodes within the data storage cluster, to ensure that the write request is not lost in case of a single node failure. Before the original receiving node acknowledges the successful write to a client, all nodes that received the write request have written the data to a temporary nonvolatile staging area. At some point later, the data will be written to a long-term mass storage in the node. The staging area may be implemented using commodity hardware to enable fast client acknowledgement. This technique also improves data reliability by replicating the write request to multiple nodes before acknowledging to the client. The technique provides for fast and secure data writing. The technique is particularly advantageous for applications leveraging enterprise level storage, where secure and fast write response that can survive node failure is highly desirable.

As discussed above, a data storage cluster contains a number of nodes. The nonvolatile storage space on each node is divided into zones as logical containers for data objects. In order to provide reliability in the face of node failure, zones form reliability groups including one or more parity zones. For example, a reliability group may contain a total of k blocks of data in the data zones of the reliability group. A "block" in this context is the smallest unit of user data managed by a node (which does not imply that a node necessarily stores or manages data in terms of "blocks" per se). Further, m blocks of reliability data (parity) may be determined based on the k blocks of data, via a method such as Reed-Solomon erasure code. Among the total n=k+m blocks in a reliability group, any k blocks can be used to reconstruct all data of the reliability group. The k number of blocks for reconstruction can be any blocks from data zones and/or parity zones from the reliability group.

In one embodiment, upon receiving a request for storing a data object at a data storage cluster, all data chunks of the data object are written to a single zone on a data node, as opposed to striping the data chunks of the data object across multiple zones. A data chunk is a contiguous portion of a data object. A data chunk may contain one or more blocks. The data chunks of the data object are written to the zone in an append-only log format. The data storage cluster enables secure and fast write response that can survive a node failure. When determining reliability data, inter-node communication is reduced to a data transmission from one node within the data storage cluster.

In one embodiment, a reliability group in a data storage cluster contains three data zones and one parity zone. The data zones and parity zone may reside on different nodes. One chunk from each data zone is denoted as data chunks $D_1$, $D_2$ and $D_3$; one chunk from the parity zone denoted as parity chunk P. All of chunks $D_1$, $D_2$, $D_3$ and P reside in the same relative location (offset) within their respective zones; thus, chunk P contains the reliability data (parity data) for chunks $D_1$, $D_2$ and $D_3$. A Reed-Solomon erasure code may be utilized to determine the reliability data in parity chunk P, based on data in data chunks $D_1$, $D_2$ and $D_3$. The parity chunk P may be computed as $P=A*D_1+B*D_2+C*D_3$. The encoding shown below illustrates how the reliability data can be generated. As shown in the encoding matrix, the reliability data P is determined by data $D_1$, $D_2$, $D_3$ and coefficients A, B, C, wherein the coefficients A, B, C are pre-determined.

$$\begin{vmatrix} 1 & 0 & 0 \\ 0 & 1 & 0 \\ 0 & 0 & 1 \\ A & B & C \end{vmatrix} \times \begin{vmatrix} D_1 \\ D_2 \\ D_3 \end{vmatrix} = \begin{vmatrix} D_1 \\ D_2 \\ D_3 \\ AD_1 + BD_2 + CD_3 \end{vmatrix} = \begin{vmatrix} D_1 \\ D_2 \\ D_3 \\ P \end{vmatrix}$$

Since data chunks of a data object are initially written to a single data zone in an append-only log format, the initial data chunks are empty and filled with predetermined values, for an instance, zeroes. Thus, the encoding is the following:

$$P = A*D_1 + B*D_2 + C*D_3$$
$$= A*0 + B*(0) + C*(0)$$
$$= 0.$$

The second operation involved is updating parity. Assuming data $D_2$ is updated to $D'_2$. The original parity $P_1$ is going to be updated to a new parity $P_2$.

$$P_2 = P_1 - B*D_2 + B*D'_2$$
$$= (A*D_1 + B*D_2 + C*D_3) - B*D_2 + B*D'_2.$$

In one embodiment, all data chunks of the data object are written to a single zone on a data node, as opposed to striping the data chunks or data chunks of the data object across zones. Therefore, a write of a data object can only change data of one zone, as well as the parity. This limits the number of nodes involved in the update process. Also, since the data object is written to a zone in an append-only log format, the original value of chunks before the writing is always zeros. Thus the data storage cluster does not need to send the old data $D_1$ and $D_3$ from the nodes storing $D_1$ and $D_3$ to the node determining the new parity $P_2$, as there is nothing to remove from the old parity $P_1$.

$$P_2 = P_1 - B * D_2 + B * D'_2$$
$$= (A * D_1 + B * D_2 + C * D_3) - B * D_2 + B * D'_2$$
$$= (A * D_1 + B * (0) + C * D_3) - B * (0) + B * D'_2$$
$$= (A * D_1 + C * D_3) + B * D'_2$$

Therefore, the data storage cluster only needs to transmit new data D'$_2$ from the node storing D'$_2$ to the node determining the new parity P$_2$. Only a single data zone and the parity zone are involved with a data writing and parity updating. Accordingly, only a node of the data zone and another node of the parity zone are involved with the data writing and parity updating.

As the data storage cluster writes incoming data to its data zones in an append-only log format, the cluster utilizes a segment cleaning process to reclaim storage space. By writing to unused log space, and then marking the previously used space as empty, the cluster can ensure that any given space within a zone is in one of two states: 1) zeroed out waiting for a write, or 2) written once with data waiting for a segment clean to set the space back to zeros. Thus, in one embodiment the segment cleaning is a process of subtracting the existing data from parity as follows:

$$P_3 = P_2 - BD'_2 + BD''_2$$
$$= (A * D_1 + B * D'_2 + C * D_3) - B * D'_2 + B * D''_2$$
$$= (A * D_1 + B * D'_2 + C * D_3) - B * D'_2 + B * (0)$$
$$= (A * D_1 + B * D'_2 + C * D_3) - B * D'_2$$
$$= P_2 - BD'_2$$

The timing of the segment cleaning is a policy decision. In one embodiment, segment cleaning is conducted when a zone becomes full. In another embodiment, the data storage cluster determines to clean a portion of the data zone of a data node, when the portion is no longer allocated to any data objects stored in the data storage cluster.

Each single data object is written sequentially to a single data zone on a node. Accordingly when the data object is read, it is read from the single data zone sequentially, improving read performance. No data communications between nodes are needed to retrieve separate chunks of a data objects striped across multiple nodes, in order to respond to a read request. The process of handling a write request is simple, since only coordination between one data node and parity nodes is needed; other nodes having rest of the data nodes of the reliability group does not participate in the write request.

Zones provide a useful abstraction between chunks and physical nodes, and reduce metadata updates in the event of a node loss. Striping a data object across multiple nodes can result in a potential increase in the amount of metadata generated, since locations of chunks of the object in different nodes need to be tracked. By confining the writing of the object in a single zone in a node, metadata efficiency is improved.

When striping an object across nodes, different rules may be applied based on the size of the object. For example, larger chunk size may demand more parity zones. Moreover, small objects typically resort to straight k-way replication, i.e. just replicating the chunk. Writing of the object is simplified by bounding the write to a single zone; storage efficiency is improved.

Figure 7:
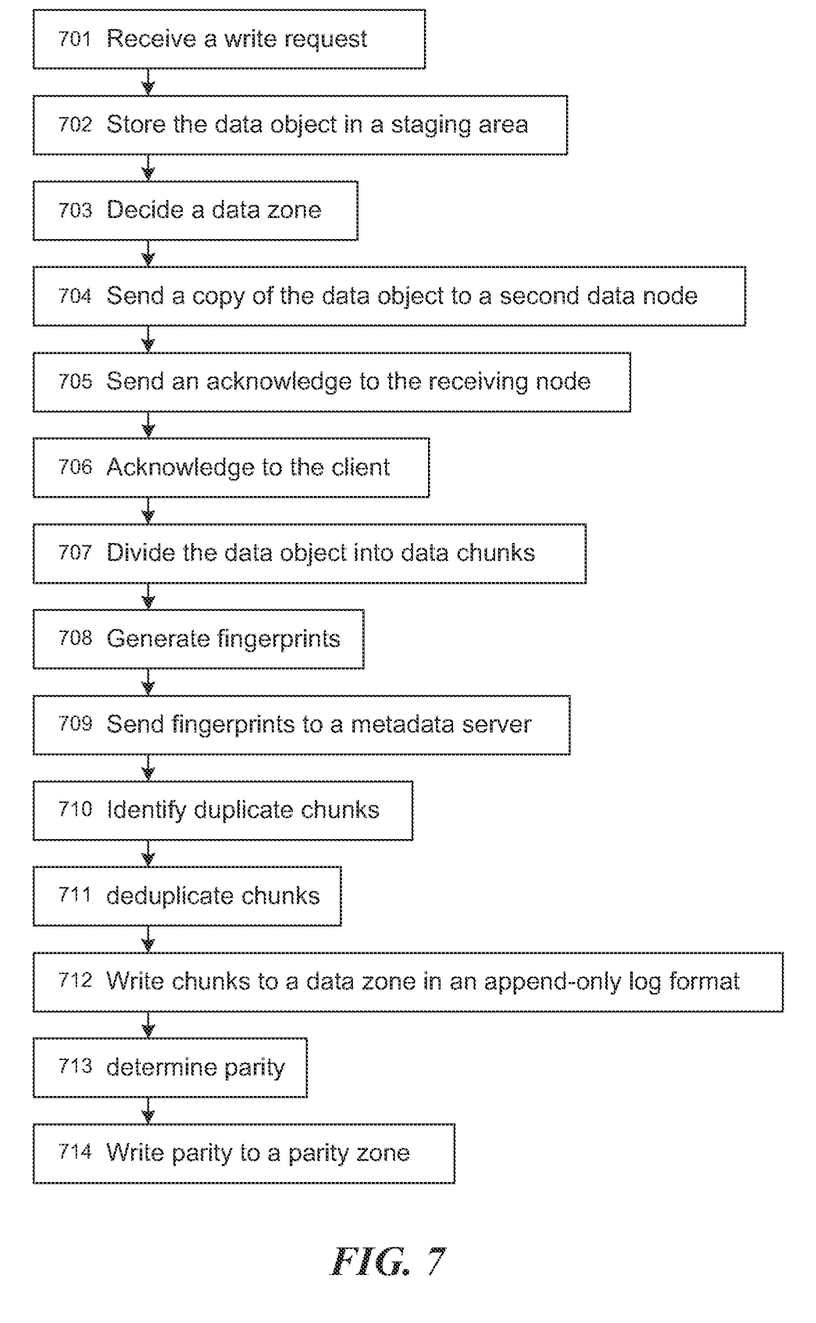
FIG. 7 illustrates a sample of a process of the data storage cluster handling a write request.

FIG. 7 illustrates a sample of a process of a data storage cluster handling a write request according to the technique introduced here. First, a data node 310 in the data storage cluster 300 from FIG. 3, receives a write request submitted by a client for writing a data object (701). The data node 310 stores the data object in a staging area of a nonvolatile memory such as flash or magnetic hard disk (702) and determines a data zone 311 in the node to which to write the data object (703). In some embodiments, a metadata node of the data storage cluster 300 may decide which data zone in the receiving node to which to store the data object. The data node 310 sends a copy of the data object to another data node 340 of the cluster 300 (704), wherein the data node 340 contains a parity zone 341 which is in the same reliability group as the data zone 311 in the data node 310. The data node 340 stores the data object in its staging area, and sends an acknowledgement to the data node 310 (705). The data node 310 receives the acknowledgement from the second node, and then acknowledges the write request to the client (706).

Next, the data node 310 divides the data object into data chunks (707). The size of the chunk is configurable and can be predetermined or dynamically determined. The data node 310 generates signatures (also referred to as fingerprints) for the data chunks (708). A signature may be a hash value determined from a content of a data chunk and is used for purposes of data deduplication.

The data node 310 may send these chunk signatures to a metadata node of the data storage cluster 100 from FIG. 1 (709). A storage data cluster may include one or more metadata nodes (also referred to as metadata servers) recording metadata for various purposes. For example, metadata servers may record locations and signatures of all data stored in the storage data cluster for the purpose of deduplication. The metadata node compares these chunk signatures with records of existing data chunks to determine if a byte-by-byte comparison of the chunks is needed to further identify duplicate chunks. The records of existing data chunks may be maintained in a global chunk map. If two data chunks have identical signatures, the data chunks probably are identical. The metadata node then does a byte-by-byte comparison of the chunks to determine if the chunks actually are identical (710). The metadata node responds to the data node 310 about the duplicate chunks. The data node 310 conducts deduplication of data stored in the data node 310, replaces the references of the duplicate data chunks with identifiers of chunks that already exist in other nodes (711). In one embodiment, the identifiers of these chunks are recorded in an object record, e.g. an inode file, of the data object in the data node 310, as references to the locations of the deduplicated data chunks. An object record is a data structure that contains metadata about a particular data object, including references to the chunks that form the object and the data nodes on which those chunks reside.

Accordingly, the data node 310 writes the chunks of the data object that are not identified as duplicate chunks to the data zone 311 in an append-only log format (712). In certain embodiments, the data node 310 writes all chunks of the data object to the data zone 311 in an append-only log format, without deduplication. The data node 340 coordinates with the data node 310 for computing the parity store in parity zone 341. The data node 340 computes the parity for the chunks that the data node 310 writes to the data zone 311 (713), by using the chunks received from the data node 310.

The determination of parity does not require use of information from nodes other than the data nodes 310 and 340. Then the data node 340 writes the parity at the same offsets in the parity zone 341 where the data node 310 wrote the data chunks in the data zone 311 (714). Accordingly, the parity is written to the parity zone 341 of the data node 340 in the same append-only log format as the data zone of the data node 310. The data object in the staging area may be removed, i.e., destaged, when the chunks of the data object are written to data zones.

After the above process is executed, a request for storing a second data object including one or more data chunks may be received at the data node 320 of the data storage cluster 300 from FIG. 3. Similar to the process of handling the previous data object, the data chunks of the second data object are written to the data zone 321 of the data node 320 in an append-only log format. The data zone 321 in data node 320 is assigned to the reliability group to which the data zone 311 and parity zone 341 are assigned. The data node 320 sends the data chunks of the second data object to the data node 340. The data node 340 updates parity values in parity zone 341 for the reliability group based on the data chunks of the second data object received by the data node 340. The updating of the parity values does not require the use of information from data nodes other than data nodes 320 and 340. In certain embodiments, the parity updating may involve combine the data from data zone 321 with the data from parity zone 341. For example, new parity may be determined by subtracting the data from data zone 321 from the data from parity zone 341

Software or firmware for use in implementing the techniques introduced here may be stored on a machine-readable storage medium and may be executed by one or more general-purpose or special-purpose programmable microprocessors. A "machine-readable storage medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible storage medium includes recordable/non-recordable media (e.g., read-only memory (ROM); random access memory (RAM); magnetic disk storage media; optical storage media; flash memory devices; etc.), etc.

The term "logic", as used herein, can include, for example, programmable circuitry programmed with specific software and/or firmware, special-purpose hardwired circuitry, or a combination thereof.

In addition to the above mentioned examples, various other modifications and alterations of the invention may be made without departing from the invention. Accordingly, the above disclosure is not to be considered as limiting and the appended claims are to be interpreted as encompassing the true spirit and the entire scope of the invention.

What is claimed is:

1. A method, comprising:
   receiving, at a first node of a plurality of nodes within a data storage cluster, a request for storing a data object including one or more data chunks, wherein a signature of each of the one or more data chunks is determined and is sent to a metadata server of the data storage cluster;
   writing, by the first node, the received one or more data chunks to a data zone in an append-only log format upon determining the data zone to write the received one or more data chunks, wherein the data zone is assigned to a reliability group defined across more than one of the plurality of nodes within the data storage cluster;
   sending, by the first node, the written one or more data chunks of the data object to a second node of the plurality of nodes within the data storage cluster, wherein the second node includes a parity zone assigned to the reliability group to which the data zone of the first node is assigned;
   determining parity chunks for the reliability group at the second node based on the sent one or more data chunks wherein the determining of the parity values does not require use of information from nodes other than the first and second nodes; and
   writing, by the first node, the determined parity chunks to a parity zone of the second node in the append-only log format.

2. The method of claim 1, wherein each parity chunk of the parity chunks is written to the parity zone of the second node at an offset at which a corresponding data chunk of the data chunks is written to the data zone of the first node.

3. The method of claim 1, wherein the signature of the data chunks are determined by a hash function.

4. The method of claim 1, further comprising:
   deduplicating, by the first node, one or more data chunks when a metadata server matches the signature of the deduplicated data chunks with one or more entries in a global chunk map;
   transmitting to the first node the locations of the deduplicated data chunks according to the global chunk map; and
   instructing, by the first node, to write the data chunks other than the deduplicated data chunks to the data zone of the first node.

5. The method of claim 4, further comprising:
   recording by first node, the locations of the deduplicated data chunks to an object record of the data object in the first node, wherein the object record is an inode.

6. The method of claim 1, further comprising:
   determining, by the first node, to clean a portion of the data zone of the first node, when the portion is no longer allocated to any data objects stored in the data storage cluster;
   sending, by the first node, data in the portion of the data zone of the first node to the second node;
   cleaning, by the first node, the portion of the data zone by marking the portion with a predetermined value; and
   updating, by the first node, a corresponding portion of the parity zone of the second node, by combining the data in the portion of the data zone from data of the corresponding portion of the parity zone.

7. The method of claim 1, wherein the data chunks are written to the data zone of the first node in an append-only log format so that the data zone is being written in an increasing order.

8. The method of claim 1, wherein a second data zone of a third node of the plurality of nodes within the data storage cluster is assigned to the reliability group, along with the data zone of the first node and the parity zone of the second node, and wherein the parity chunks determination on the second node after receiving data chunks from the first node does not require use of data from the second data zone of the third node assigned to the reliability group.

9. The method of claim 1, further comprising:
   receiving, by first node, a request for storing a second data object including one or more data chunks;

writing, by the first node, the data chunks of the second data object to a second data zone of a third node in an append-only log format, wherein the second data zone is assigned to the reliability group to which the data zone of the first node and the parity zone of the second node are assigned;

sending, by the first node, the data chunks of the second data object to the second node of the plurality of nodes within the data storage cluster; and updating, by the first node, parity values for the reliability group at the second node based on the data chunks of the second data object received by the second node, wherein the updating of the parity values does not require use of information from nodes other than the second and third nodes.

10. A non-transitory computer readable medium having stored thereon instructions for managing storage comprising executable code which when executed by one or more processors, causes the processors to perform steps comprising:

receiving a request for storing a data object including one or more data chunks, wherein a signature of each of the one or more data chunks is determined and is sent to a metadata server of the data storage cluster;

writing the received one or more data chunks to a data zone of a first node in an append-only log format upon determining the data zone to write the received one or more data chunks, wherein the data zone is assigned to a reliability group defined across more than one of the plurality of nodes within the data storage cluster;

sending the written one or more data chunks of the data object to a second node of the plurality of data nodes within the data storage cluster, wherein the second node includes a parity zone assigned to the reliability group to which the data zone of the first node is assigned;

determining parity chunks for the reliability group at the second node based on the sent one or more data chunks wherein the determining of the parity values does not require use of information from nodes other than the first and second nodes; and writing the determined parity chunks to a parity zone of the second node in the append-only log format.

11. The medium as set forth in claim 10 wherein each parity chunk of the parity chunks is written to the parity zone of the second node at an offset at which a corresponding data chunk of the data chunks is written to the data zone of the first node.

12. The medium as set forth in claim 10 further comprising:

wherein the signature of the data chunks are determined by a hash function;

deduplicating one or more data chunks when a metadata server matches the signature of the deduplicated data chunks with one or more entries in a global chunk map;

transmitting to the first node the locations of the deduplicated data chunks according to the global chunk map; and instructing to write the data chunks other than the deduplicated data chunks to the data zone of the first node.

13. The medium as set forth in claim 10 wherein:

the data chunks are written to the data zone of the first node in an append-only log format so that the data zone is being written in an increasing order; and wherein a second data zone of a third node of the plurality of nodes within the data storage cluster is assigned to the reliability group, along with the data zone of the first node and the parity zone of the second node, and wherein the parity chunks determination on the second node after receiving data chunks from the first node does not require use of data from the second data zone of the third node assigned to the reliability group.

14. The medium as set forth in claim 10 further comprising:

receiving a request for storing a second data object including one or more data chunks;

writing the data chunks of the second data object to a second data zone of a third data node in an append-only log format, wherein the second data zone is assigned to the reliability group to which the data zone of the first node and the parity zone of the second node are assigned;

sending the data chunks of the second data object to the second node of the plurality of nodes within the data storage cluster; and updating parity values for the reliability group at the second node based on the data chunks of the second data object received by the second node, wherein the updating of the parity values does not require use of information from nodes other than the second and third nodes.

15. A storage node device comprising:

a processor;

a memory coupled to the processor which is configured to be capable of executing programmed instructions comprising and stored in the memory to:

receive a request for storing a data object including one or more data chunks, wherein a signature of each of the one or more data chunks is determined and is sent to a metadata server of the data storage cluster;

write the received one or more data chunks to a data zone of a first node in an append-only log format upon determining the data zone to write the received one or more data chunks, wherein the data zone is assigned to a reliability group defined across more than one of the plurality of nodes within the data storage cluster;

send the written one or more data chunks of the data object to a second node of the plurality of data nodes within the data storage cluster, wherein the second node includes a parity zone assigned to the reliability group to which the data zone of the first node is assigned;

determine parity chunks for the reliability group at the second node based on the sent one or more data chunks wherein the determining of the parity values does not require use of information from nodes other than the first and second nodes; and write the determined parity chunks to a parity zone of the second node in the append-only log format.

16. The device as set forth in claim 15 wherein each parity chunk of the parity chunks is written to the parity zone of the second node at an offset at which a corresponding data chunk of the data chunks is written to the data zone of the first node.

17. The device as set forth in claim 15 wherein the processor coupled to the memory is further configured to be capable of executing at least one additional programmed instruction comprising and stored in the memory to:

wherein the signature of the data chunks are determined by a hash function;

deduplicate one or more data chunks when a metadata server matches the signature of the deduplicated data chunks with one or more entries in a global chunk map;

transmit to the first node the locations of the deduplicated data chunks according to the global chunk map; and instruct to write the data chunks other than the deduplicated data chunks to the data zone of the first node.

18. The device as set forth in claim 15 wherein:

the data chunks are written to the data zone of the first node in an append-only log format so that the data zone is being written in an increasing order; and wherein a second data zone of a third node of the plurality of nodes within the data storage cluster is assigned to the reliability group, along with the data zone of the first node and the parity zone of the second node, and wherein the parity chunks determination on the second node after receiving data chunks from the first node does not require use of data from the second data zone of the third node assigned to the reliability group.

19. The device as set forth in claim 15 wherein the processor coupled to the memory is further configured to be capable of executing at least one additional programmed instruction comprising and stored in the memory to:

receive a request for storing a second data object including one or more data chunks;

write the data chunks of the second data object to a second data zone of a third node in an append-only log format, wherein the second data zone is assigned to the reliability group to which the data zone of the first node and the parity zone of the second node are assigned;

send the data chunks of the second data object to the second node of the plurality of nodes within the data storage cluster; and update parity values for the reliability group at the second node based on the data chunks of the second data object received by the second node, wherein the updating of the parity values does not require use of information from nodes other than the second and third nodes.

* * * * *

UNITED STATES PATENT AND TRADEMARK OFFICE
CERTIFICATE OF CORRECTION

PATENT NO. : 9,740,403 B2
APPLICATION NO. : 14/636055
DATED : August 22, 2017
INVENTOR(S) : Storer et al.

Page 1 of 1

It is certified that error appears in the above-identified patent and that said Letters Patent is hereby corrected as shown below:

In the Claims

Claim 1, Column 12, Line 12, delete "values" and insert --chunks--.
Claim 9, Column 13, Lines 10 and 13, delete "values" and insert --chunks--.
Claim 10, Column 13, Line 38, delete "values" and insert --chunks--.
Claim 14, Column 14, Lines 19 and 22, delete "values" and insert --chunks--.
Claim 15, Column 14, Line 49, delete "values" and insert --chunks--.
Claim 19, Column 16, Lines 13 and 16, delete "values" and insert --chunks--.

Signed and Sealed this
Twenty-eighth Day of August, 2018

Andrei Iancu
*Director of the United States Patent and Trademark Office*